United States Patent [19]

Gray

[11] 4,223,958
[45] Sep. 23, 1980

[54] MODULAR COMPLIANT HYDRODYNAMIC BEARING WITH OVERLAPPING BEARING SHEET

[75] Inventor: Stanley Gray, Skaneateles, N.Y.

[73] Assignee: Mechanical Technology Incorporated, Latham, N.Y.

[21] Appl. No.: 974,254

[22] Filed: Dec. 29, 1978

[51] Int. Cl.³ .............................................. F16C 32/06
[52] U.S. Cl. .................................... 308/9; 308/121; 308/160; 308/DIG. 1
[58] Field of Search ............... 308/9, 26, 36.3, 73, 308/121, 160, 168, DIG. 1

[56] References Cited

U.S. PATENT DOCUMENTS

| | | | |
|---|---|---|---|
| 3,382,014 | 5/1968 | Marley | 308/160 |
| 3,635,534 | 1/1972 | Barnett | 308/160 |
| 3,677,612 | 7/1972 | Barnett et al. | 308/9 |
| 4,005,914 | 2/1977 | Newmann | 308/DIG. 1 |
| 4,082,375 | 4/1978 | Fortmann | 308/DIG. 1 |
| 4,133,585 | 1/1979 | Licht | 308/9 |

*Primary Examiner*—Richard R. Stearns
*Attorney, Agent, or Firm*—Joseph V. Claeys; John M. Neary

[57] ABSTRACT

A resilient, compliant, hydrodynamic fluid film bearing, for positioning between a stationary member and the bearing surface of a rotor, includes a bearing module formed as a unitary one-piece article having a resilient support section and a bearing surface section which overlaps its own resilient support section, or that of the next adjacent module, to provide a low cost bearing which is easy, fast and economical to manufacture and assemble.

24 Claims, 8 Drawing Figures

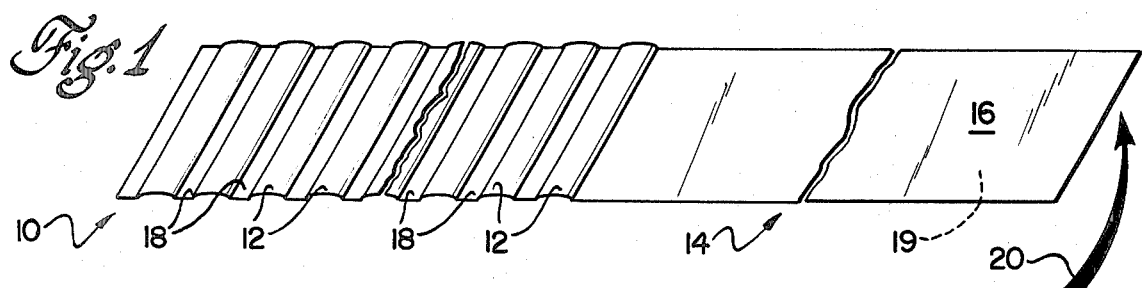
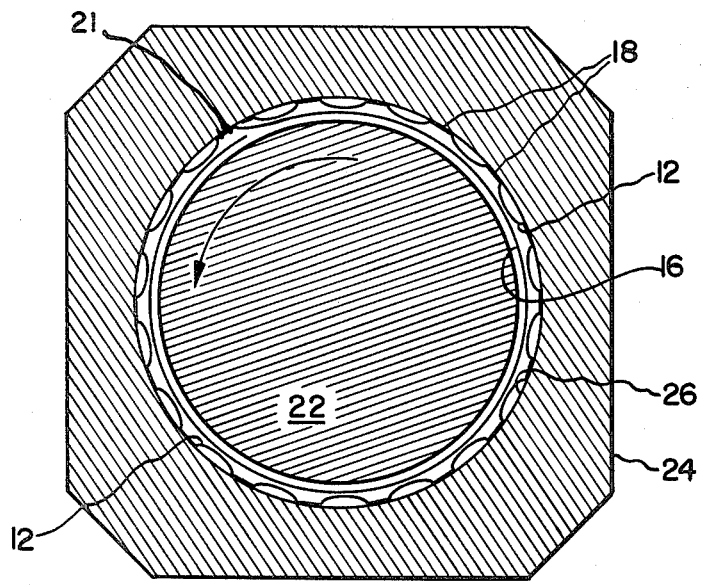
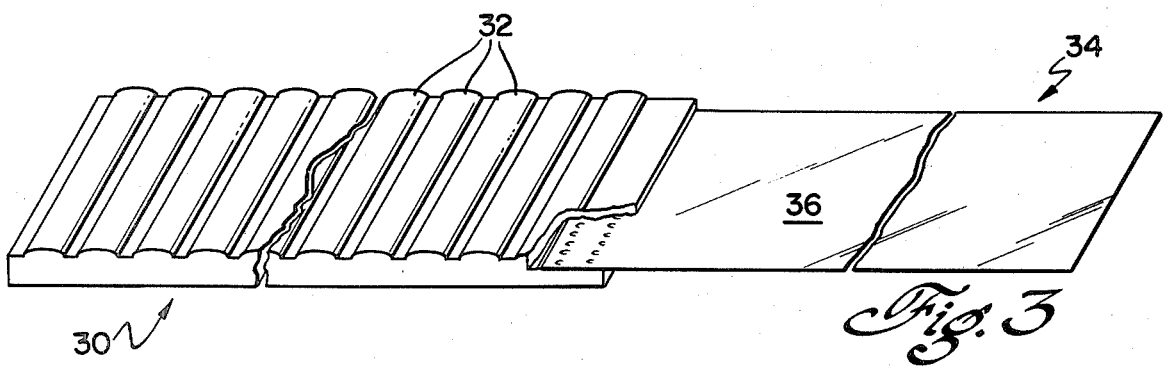
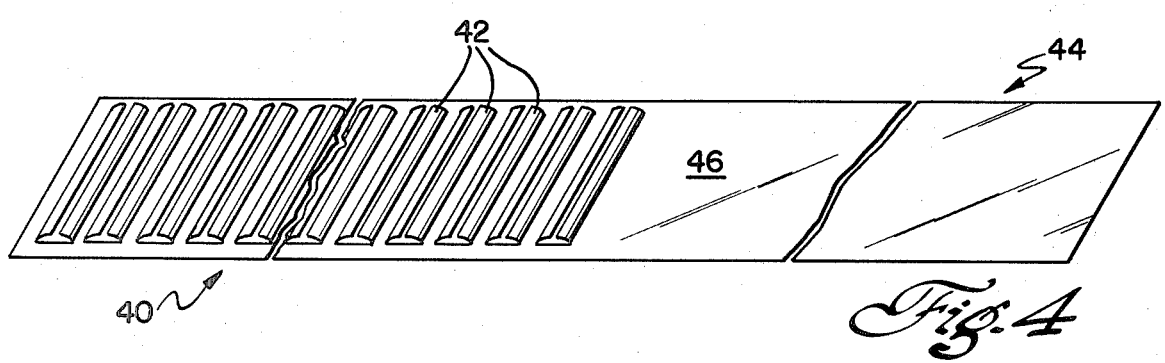

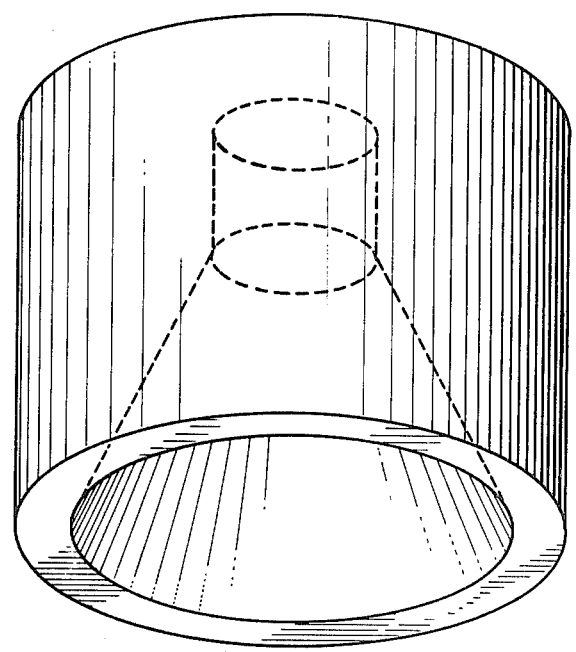
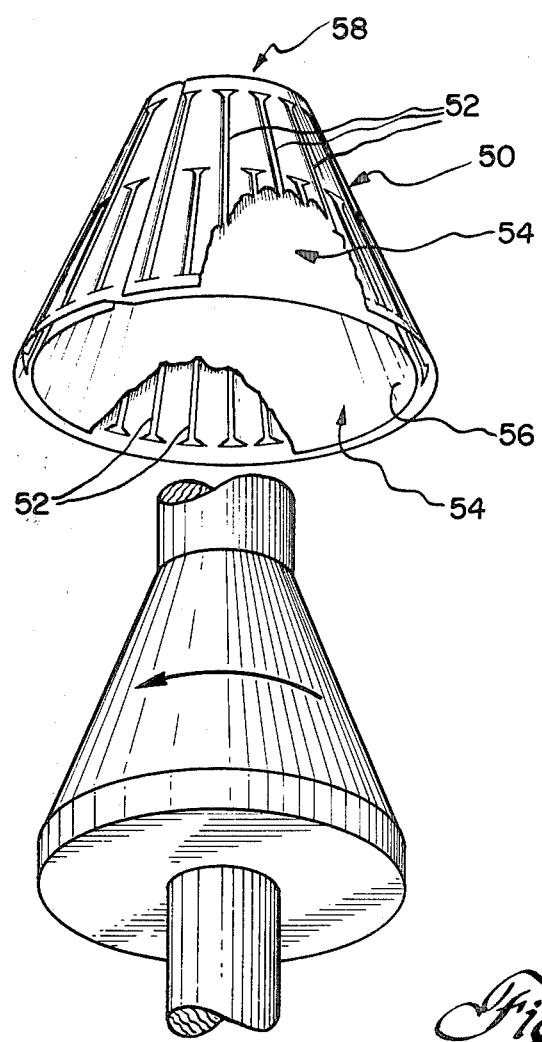
Fig. 5

MODULAR COMPLIANT HYDRODYNAMIC BEARING WITH OVERLAPPING BEARING SHEET

BACKGROUND OF THE INVENTION

This invention relates to compliant hydrodynamic fluid film bearings. The long life and low friction performance of compliant hydrodynamic fluid film bearings in ultra-high speed applications and in hostile environments which preclude the use of conventional lubrication has been attracting increasing interest among experts in the bearing art. One advantage of bearings of this nature, which has not been appreciated in the art however, is the potential cost savings which can be realized by the use of these bearings, instead of conventional bearings, in ordinary consumer products.

In this connection, factors which affect the economics of high volume manufacture and assembly and which have hitherto received scant attention in the fluid bearing art become important economically. In high volume products, where the cost of the individual bearing and the labor cost in assembling the product are significant, it is desirable that the assembly of the bearing in the product be fast, uncomplicated, and "fool proof" as possible. In addition, for the sake of simplicity of supply assembly, and inventory control, it is desirable that the number of individual parts from which the bearing is assembled be kept low. Finally, for ease of assembly and repair, the bearings should be interchangeable so that the bearing can be removed and replaced if it is or becomes damaged.

SUMMARY OF THE INVENTION

Accordingly, the objects of this invention are to provide a compliant hydrodynamic fluid bearing which is economical to manufacture and assemble in the product. The bearing can be formed of identical modules, requiring only a single inventory item, and the same bearing design can be used to produce a family of bearings having a range of bearing load capacity and stiffness.

Many of the background factors, objects and advantages of the invention of this application relate also to my co-pending application filed concurrently herewith, application Ser. No. 974,259 entitled "Hydrodynamic Compliant Thrust Bearing", the disclosure of which is incorporated herein by reference.

This invention contemplates the use of a single bearing element having both resilient supporting structure and a flexible compliant bearing sheet. The single module can be assembled in sections to produce a composite bearing wherein the resilient supporting member underlies and supports the bearing sheet member of the preceding bearing module, or the entire bearing can be made from a single module in which the bearing sheet member completely overlies the resilient underlying support member to which it is connected at one end.

DESCRIPTION OF THE DRAWINGS

These and other objects of the invention, and the invention itself, will become better understood by reference to the attached description of the preferred embodiments when read in connection with the accompanying drawings, wherein:

FIG. 1 is a perspective view of a bearing module in accordance with this invention;

FIG. 2 is a sectional elevation of the bearing module shown in FIG. 1 assembled in a bearing cartridge;

FIG. 3 is a perspective view of a second embodiment of this invention made in the form of a journal bearing;

FIG. 4 is a perspective view of a third embodiment of this invention made in the form of a journal bearing;

FIG. 5 is a perspective view of a fourth embodiment of this invention made in the form of a conical thrust bearing.

DESCRIPTION OF THE PREFERRED EMBODIMENT

Figure 6:
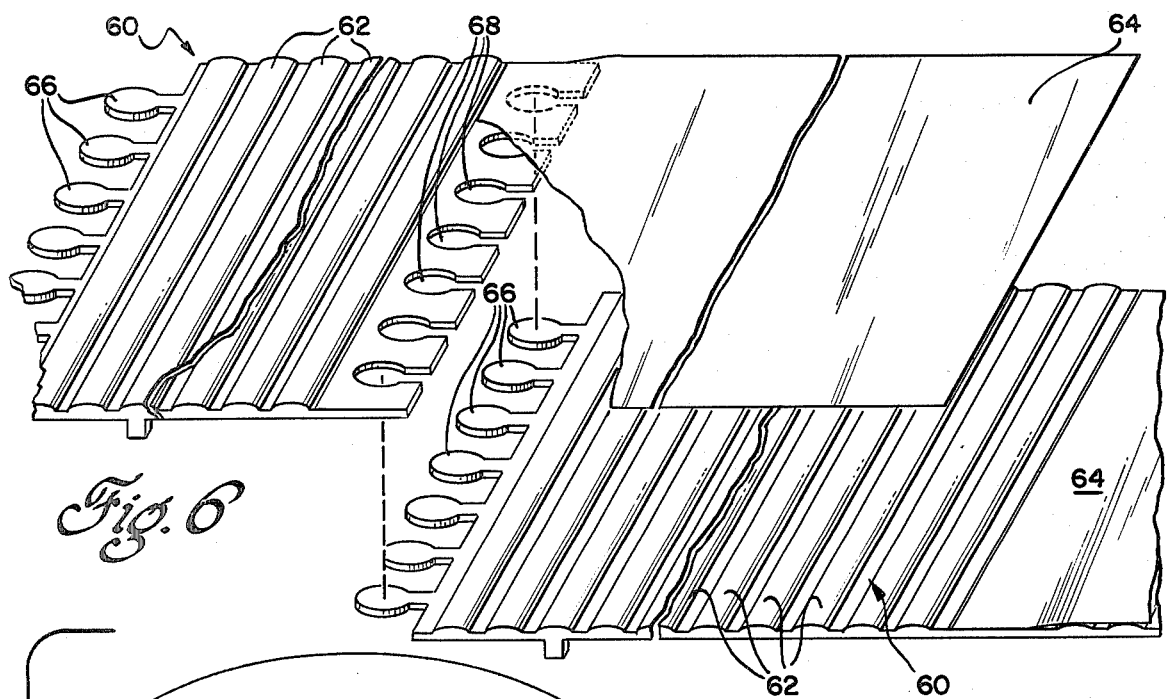
FIG. 6 is a perspective view of a fifth embodiment of this invention made in the form of a journal bearing assembled from a plurality of identical modules.

Turning now to the drawings, wherein like-reference characters designate identical or corresponding parts, and particularly to FIGS. 1 and 2 thereof, a unitary compliant hydrodynamic journal bearing member is shown separately (in FIG. 1) and in assembled form in a bearing cartridge, supporting a rotating shaft (in FIG. 2). The compliant hydrodynamic bearing is a composite assembly including a resilient supporting element and an attached overlying bearing sheet. This composite bearing lines the inside of the bearing sleeve, or the face of the thrust plate, and is in bearing relationship to the shaft or thrust runner which, according to compliant bearing theory, is supported on a hydrodynamic fluid film generated by the relative movement of the shaft or thrust runner over the bearing sheet. The compliance of the supporting element underlying the bearing sheet enables it to deflect to assume the optimum shape relative to the opposing bearing surface to produce the maximum supporting fluid pressure and distribution. It also enables the bearing sheet to conform, to some extent, to misaligned and thermally distorted shafts and thrust runners. The supporting element is more compliant than the fluid film so it will deflect before the fluid film is breached.

In the embodiment of FIGS. 1 and 2, the composite bearing assembly is formed of a single continuous module consisting of a sheet of flexible metal, such as stainless steel, having a first section 10 formed in a regular series of raised resilient sections 12 presenting a corrugated appearance. A second continuous section 14, integral with the first section 10, has a smooth inside bearing surface 16 which may be coated with an antifriction coating, such as "MolyKote" or "HL-800," proprietary antifriction coatings of Hohman Plating and Manufacturing Company and Mechanical Technology Incorporated, respectively. Bearings experiencing only moderate temperatures can use Teflon as the anti-friction coating.

The composition and method of application of the "HL-800" coating is disclosed in the copending application Ser. No. 974,264 entitled "High Temperature Low Friction Surface Coating", of Bharat Bhushan filed concurrently herewith, the disclosure of which is hereby incorporated by reference. These coatings are used primarily in applications in which the lubricating fluid is a gas, such as air or helium. If the gas film of a gas bearing is breached and high speed contact between the relatively rotating bearing members occurs, damage can result. In addition, during start-up or slow-down or the rotor, the rotor's bearing surface is supported directly by the bearing surface 16, so it is desirable to coat the surface with a solid lubricant film to provide lubrication during these phases of operation when the hydrodynamic effect is not operating.

The area between the raised elevations 12 on the corrugated section 10 is formed in flat lands 18. These flat lands, or the entire upper and lower surfaces of the first section 10 and the outside surface 19 of the smooth section 14, opposite the inside surface 16 may be coated with a friction-enhancing material and/or textured as by electrolytic etching to produce a friction-enhancing surface texture. The friction-enhancing materials and/or texturing are selected to optimize the frictional properties of the surfaces in order to yield the degree of coulomb damping best suited for the particular application.

In use, the bearing is rolled up in the direction shown by arrow 20 to form a two-layer roll, with the smooth section 14 forming the inner layer of the roll, as shown in FIG. 2, with the inside surface 16 facing inwardly, and is fastened to the wall of a bearing sleeve 24, as by welding at 21. A shaft 22 is inserted in the bearing with its circumferential surface in bearing relationship with the surface 16. The flat lands 18 on the corrugated section 10 bear against the inner wall 26 of the bearing sleeve 24 and the peaks of the raised resilient sections 12 bear against and support the outside face 19 of the smooth section 14.

A second embodiment of the invention, shown in FIG. 3, is a single bearing module employing an elastomer mat 30 having molded resilient projections 32 corresponding in form and function to the projections 12 of the first section of the embodiment shown in FIG. 1. A flat, flexible metal sheet 34 is integrally molded at one end in one end of the elastomer mat 30 to provide a unitary bearing module which can be rolled up in a manner corresponding to that shown in FIG. 2, and inserted in a journal bearing sleeve with the top surface 36 of the flexible sheet 34 facing inwardly towards the shaft and resiliently supported by the resilient projections 32 of the elastomer mat section 30. Although the first and second sections are connected together, they are formed of separate pieces. Therefore, the projections 32 may be considered to be discontinuous from the bearing sheet 34. This enables the characteristics of each section to be individually optimized for the particular requirements of the bearing. The end of the metal sheet 34 may be dimpled, perforated and/or textured to ensure a strong and permanent bond between the metal sheet 34 and the elastomer mat 30. The elastomer section may be fastened to the journal bearing sleeve with cement, and the sheet 34 is left free at the leading edge, as in FIG. 3, to give the necessary freedom of movement in operation.

The embodiment of the invention shown in FIG. 4 is a single bearing module consisting of a sheet of flexible metal having a first section 40 in which are formed, as by stamping, raised projections 42 in the form of bumps, each split longitudinally along its crest and extending laterally across the length of the sheet. The other half 44 of the sheet is flat and includes an upper surface 46 which constitutes the bearing surface facing the shaft when the sheet is rolled up in the same manner as the embodiments of FIGS. 1 and 3, as indicated in FIG. 2. Although the first and second sections are formed of a single sheet of metal, the crest of each projection 42 terminates in a pair of free edges which can be considered discontinuous with the bearing sheet 44. This enables the projections to deflect independently without causing circumferential movement of the module as a unit. The bearing surface 46 may be coated with a friction reducing material such as "HL-800," and the other surfaces may be coated or treated to optimize their frictional properties, as mentioned previously.

Turning now to FIG. 5, a unitary overlapping conical compliant fluid bearing having both thrust and radial load capacity consists of a single bearing module as is shown in this perspective view. Typically, another conical bearing assembly, the mirror image of that shown in FIG. 5, will be located at the other end of the shaft to bear radial loads at that end and also axial loads in the other direction. The module includes a resilient section 50 in which spaced resilient projections 52, of alternating length for axial uniformity of stiffness, are formed in the same manner as in FIG. 4 for supporting an overlying smooth section 54, which is formed integrally on the end of the resilient support section 50. This embodiment of the invention is in the form of a broad, helical tape having a central bore 58. The upper surface (shown facing down in FIG. 5) of the smooth section 54 may be coated with a suitable friction reducing coating, such as the aforementioned "HL-800," to reduce start-up torque, and to prevent galling in the case of high speed touch down. The module should be fastened, as by welding, to its conical bearing cartridge, preferably at the trailing edge, or at the junction between the smooth section 54 and the support section 50, to permit relative movement of the smooth section 54 and the supporting section 50 during operation, and to prevent the tape from wrapping around and gripping the conical end of the rotor in the manner of a band brake or spring clutch.

Referring now to FIG. 6, another aspect of the invention is shown wherein the unitary bearing member is formed of a plurality of separate identical modules which can be assembled and fastened together in an integral form either prior to, or at the same time, the entire bearing is assembled in its bearing cartridge. The individual bearing modules each include a first molded elastomer mat section 60 having a series of resilient projections 62 formed on one surface thereof for resiliently supporting the second section 64 of the module which is a smooth, flexible sheet of bearing material, such as stainless steel, attached to or near the end of the first section 60. The support sections 60 each have a length equal to an integer fraction of the inner circumference of the bearing sleeve and the composite bearing is assembled in a number of sections, the combined length of whose sections 60 just equals the internal circumference of the bearing sleeve or cartridge. When the number of support sections is one, as in the embodiment of FIG. 3, the integer fraction is 1/1; when two or three modules are used it will be $\frac{1}{2}$ and $\frac{1}{3}$, respectively. The assembled strip is then rolled in a cylindrical roll, and the two ends are fastened together in the same manner that the individual modules were fastened together to form the strip. In the particular embodiment of FIG. 6, the fastening together is by way of a plurality of mushroom-shaped or dovetailed projections 66 extending from one end of the module, which fit into corresponding mushroom-shaped recesses 68 on the other end of the first section 60 of each module, so that the flexible sheet 64 overlies the resilient section 60 of the succeeding adjacent module. The resulting assembly of bearing modules is a unitary cylindrical structure which is self-contained and can be inserted in its assembled form in the bearing sleeve without further need of supporting structure. Suitable tabs may be formed on the first section 60 to fit into corresponding slots in the bearing sleeve and/or the assembly may be cemented in the sleeve to prevent the bearing assembly from rotating within or otherwise moving relative to the bearing sleeve.

Figure 7:
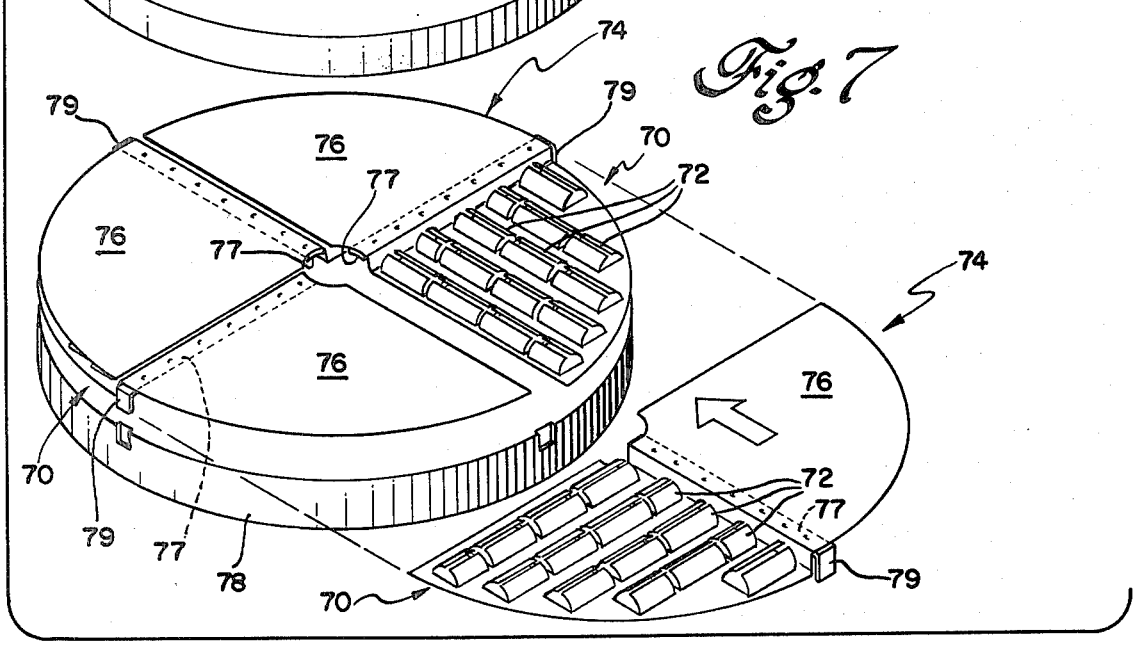
FIG. 7 is a perspective view of a sixth embodiment of this invention made in the form of a thrust bearing assembled from a plurality of identical modules.

Referring now to FIG. 7, a thrust bearing assembly is formed of individual, identical bearing modules, each of which includes a resilient support or first section 70 formed in a pattern of resilient projections in the form of longitudinally split bumps 72 similar to those in FIG. 4. The resilient support section 70 supports a second or smooth section 74 of the preceeding or downstream module, in the direction of rotation of the thrust runner. Each module forms a half circle, half of which is resilient projections 72 and half of which is smooth section 70 having a smooth upper surface 76. If more pads, for example six pads, are used, each module would equal about 120° or 360° divided by one-half the number of pads. The leading edge of the smooth section 74 of each module is fastened to a spacer block 77 along the radial center line of the module, and the spacer block is welded to the thrust plate 78 to secure the module in place. Alternatively, the spacer block 77 may be provided with downwardly bent tabs 79 that fit into grooves 80 in the thrust plate 78. The split bumps 72 on the end of the resilient section 70 lie parallel to but ending short of the radial center portion of the preceeding module. Thus, the modules do not suffer distortion in operation, because the terminal edge of the resilient section is free to move under thermal expansion, and the split bump projections 72 can flex independently of the module as a whole when the bearing sheet section 74 conforms to the bearing surface of the rotating thrust runner 82 in the event of thermal distortion or runner runout during operation.

Figure 8:
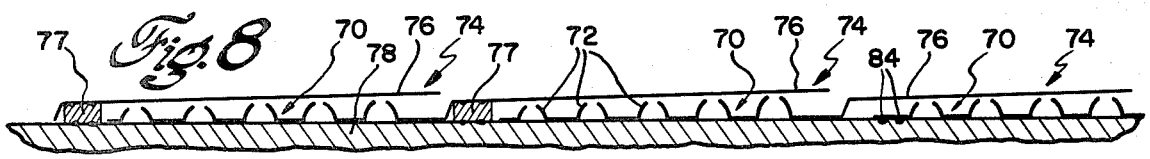
FIG. 8 is a developed sectional elevation of the thrust bearing shown in FIG. 7.

The assembled bearing, from the top, displays the appearance of a plurality of flaps formed of bearing material having smooth upper surfaces which face the thrust runner 82. The smooth bearing flaps 74 are supported by the underlying resilient sections 70 of the succeeding module in the direction of rotation of the thrust runner. The amplitude and period of the corrugations 72 can be adjusted when the modules are manufactured to provide the optimum lead-in and resilience for the generation of the hydrodynamic supporting fluid wedges. As shown in FIG. 8, the corrugations can be of low amplitude and wide wave length at the beginning of the corrugated section, and change gradually to higher amplitude and shorter wave length to give an overall wedge-shaped outline to the supporting resilient section 70 and a suitable stiffness to the support at the portions of the resilient support where it is needed.

The modules shown in FIGS. 7 and 8 could be made without the spacer blocks 77, as illustrated by the rightmost module in FIG. 8. In this embodiment, the module would be welded at 84 on the flat land portion after the last or trailing bump 70. Alternatively, the modules could be made folded over 180° with the spacer block 77 in the fold. In this way the smooth section 74 would overlie and be supported by its own support section 70. In this modification the thrust runner 78 would rotate in the direction opposite to that indicated by the arrow in FIG. 7.

The embodiments of the invention shown herein facilitate low cost fabrication and assembly techniques because the bearing modules are suited for high volume, low cost fabrication and the inventory problems are minimized because the bearings in each case are formed of unitary identical parts. The unitary construction permits great simplification of the manufacture and assembly of the bearing, and also greatly simplifies the inventory logistics of large volume operations. Any replacement of bearings of this variety that may be necessary is easy and inexpensive. The replacement cost is trivial and the assembly of the replacement bearing, in the case of the journal and conical bearings, is simply a matter of rolling up the unitary bearing member and inserting into its cartridge. In the case of the thrust bearing, it is simply a matter of dropping the replacement bearing assembly into the grooves in the thrust plate. As new materials and other bearing construction details are developed, they may be incorporated into the bearing without necessitating a redesign of the apparatus, and the replacement bearings for existing apparatus may incorporate the new designs.

Obviously, numerous modifications and variations of the disclosed embodiments of the invention are possible in view of the above-disclosure.

Accordingly, it is intended that these and other modifications are to be regarded as falling within the spirit and scope of the invention which is defined by the following claims, wherein I claim:

1. A resilient, compliant hydrodynamic fluid film bearing, comprising:

two relatively movable members defining therebetween a gap; and a single unitary bearing element disposed in said gap and attached to one of said members, said element having a first section which is vertically resilient and a second section which is smooth and integrally connected at one end to one end of said first section at a junction which forms a recess, said second section having a bearing surface facing the other of said members and vertically overlying said first section only once in overlapping relationship to form a single layer over said first section, said second section terminating in a free end which overlies said recess;

said first section including raised resilient projections distributed over the entire area thereof which resiliently and compliantly support said second section, said projections being more compliant than the fluid film generated by hydrodynamic action upon relative movement of said bearing sheet and one of said members so that said projections will deflect and permit said bearing sheet to deflect before the fluid film is breached.

2. A resilient, compliant hydrodynamic fluid film bearing comprising: two relatively movable members defining therebetween a gap; and a single unitary bearing element disposed in said gap and attached to one of said members, said element having a first section which includes an elastomer mat which is vertically resilient, and a second section which is smooth and integrally bonded at one end to one end of said first section, said second section having a bearing surface facing the other of said members and vertically overlying said first section only once in overlapping relationship to form a single layer upon said first section;

said first section including raised resilient projections distributed over the entire area thereof which resiliently and compliantly supports said second section, said projections being more compliant than the fluid film generated by hydrodynamic action upon relative movement of said bearing sheet and one of said members so that said projections will deflect and permit said bearing sheet to deflect before the fluid film is breached.

3. The bearing defined in claim 1, wherein said second and said first sections are formed of different materials.

4. The bearing defined in claim 1, wherein said first section is formed of sheet metal and said projections on said first section are each formed by slitting said first section and forming a bump in said sheet metal parallel to said slit.

5. The bearing defined in claim 4, wherein said slits define the crests of said bumps.

6. The bearing defined in claim 1, wherein said raised resilient projections on said first section are bumpform elevations formed in said first section extending across the width thereof and continuous with said second section.

7. A compliant hydrodynamic fluid film journal bearing for rotatably supporting a rotating rotor within a bearing sleeve, comprising:
at least one bearing module having a resilient supporting section and a bearing sheet attached adjacent one end of said supporting section, and extending forwardly therefrom over the adjacent free end of the adjacent underlying supporting section, overlapping and overlying and supported by said adjacent supporting section, and terminating in a free end which overlies the area of the junction of said underlying, overlapped supporting section and its attached bearing sheet, said supporting section having a length substantially equal to an integer fraction of the inner circumference of said sleeve, the denominator of said fraction being equal to the number of modules, and said bearing sheet having a length approximately equal to the length of said supporting section, and overlapping only one resilient support section and overlapping said one resilient support section only once; said resilient section including a plurality of raised resilient elevations which are more compliant than the fluid film.

8. The bearing defined in claim 7, wherein only a single bearing module is included and wherein the resilient section thereof is overlain and overlapped by its own bearing sheet.

9. The bearing defined in claim 8, wherein said module is formed from a single unitary piece of sheet metal, one-half of which is formed in a bumpform pattern of raised resilient projections and the other half of which is smooth.

10. The bearing defined in claim 8, wherein said resilient supported section is an elastomer mat and one end of said bearing sheet is bonded to one end of said elastomer mat.

11. The bearing defined in claim 8, wherein said module is formed of a single unitary piece of sheet metal, and said raised resilient elevations are formed by slits in said sheet metal running across the width thereof, the material adjacent said slits being bent in a bumpform elevation projecting beyond the plane of said sheet metal.

12. The bearing defined in claim 7, wherein a plurality of said modules are disposed in said bearing sleeve, end to end, with the resilient supporting section of one module being overlapped by the bearing sheet of the preceding module.

13. The bearing defined in claim 12, wherein said resilient supporting section of each of said modules is an elastomer mat, to one end of which is molded one end of said bearing sheet, said elastomer mat of each of said modules being cemented to the inner face of said bearing sleeve.

14. The bearing defined in claim 12, wherein said resilient supporting section of each of said modules is an elastomer mat, and said bearing sheet is molded into said mat adjacent one end thereof, each end of said mats having interlocking configurations thereon for connecting adjacent ends of adjacent mats together, and means for securing said mats in said sleeve against axial and angular motion therein.

15. A resilient, compliant hydrodynamic fluid bearing comprising:
a stationary member and a movable member, said members defining therebetween a gap;
a single unitary bearing member disposed within said gap, and formed of a plurality of identical bearing modules cooperating together;
said modules each including a supporting section having raised resilient projections formed thereon, and a smooth flexible compliant section having one end free and the other end connected to and forming a junction with one end of the supporting section; and
said modules being juxtaposed to form a unitary bearing member by the modules being fastened in position to said stationary member, with the other end of said supporting section being juxtaposed to the junction of an adjacent module, with the compliant section of one module overlying the supporting section of the succeeding module in the direction of rotation of the movable member which moves with respect to said bearing.

16. The bearing defined in claim 15, wherein said bearing is a thrust bearing having a thrust plate, and said modules are formed of sheet metal sectors and are fastened to said thrust plate at the junction zone between said supporting section and said smooth section.

17. The bearing defined in claim 16, wherein said modules include a spacer block welded to said sheet metal sectors at approximately the angular midpoints thereof, and said spacer blocks are secured to said thrust plate.

18. The bearing defined in claim 17, wherein said spacer block includes downwardly bent tabs at each end which engage grooves formed in said thrust plate to hold said modules in place against angular and lateral motion relative to said thrust plate.

19. The bearing defined in claim 15, wherein the supporting sections of said modules are fastened to said stationary member end to end, the length of said supporting sections each being substantially equal to an integer fraction of the circumferential length of said stationary member, with the denominator of said fraction being equal to the number of said modules.

20. The bearing defined in claim 19, wherein said supporting sections are elastomer mats fastened to said stationary member by cement.

21. The bearing defined in claim 19, wherein said supporting sections are fastened together end-to-end by means of interlocking configurations on each end of each supporting section.

22. A compliant hydrodynamic fluid film bearing, comprising a stationary thrust bearing member and a rotating bearing member, said members defining a gap therebetween;

a composite bearing structure positioned within said gap, said composite bearing structure including at least one bearing module;

each of said modules being fastened to said thrust bearing member along one radially extending zone on said bearing module and including a resilient supporting section and a smooth bearing sheet section, one end of said supporting section being connected to and forming a junction with one end of said bearing sheet section and extending forwardly therefrom;

said bearing sheet overlapping and overlying an adjacent supporting section, with the other end of said supporting section lying adjacent an associated junction;

said supporting section including a plurality of raised resilient elevations which resiliently and compliantly support said bearing sheet, said elevations being more compliant than said fluid film;

whereby said bearing sheet and said supporting section can flex and can expand and contract angularly to accommodate loading fluctuations induced by thermal distortion and by runout during operation.

23. The bearing defined in claim 22, wherein said bearing is a conical bearing and includes a single unitary overlapping helical tape having one resilient support section completely encircling the thrust surface of said thrust bearing member, said thrust surface being in the form of a cone.

24. The bearing defined in claim 22, wherein said thrust bearing member is planar and said composite bearing structure includes a plurality of bearing modules connected to said thrust bearing member;

said other end of said support section of each of said modules lying adjacent said junction of the preceding module in the direction of of said rotating beading member rotation;

each of said modules being connected to said thrust bearing member at said junction.

* * * * *